US012612487B2

(12) United States Patent
Yamada et al.

(10) Patent No.: US 12,612,487 B2
(45) Date of Patent: Apr. 28, 2026

(54) CYCLOOLEFIN COPOLYMER AND HYDROGENATED PRODUCT THEREOF, AND OPTICAL ELEMENT

(71) Applicant: ZEON CORPORATION, Tokyo (JP)

(72) Inventors: Satoshi Yamada, Tokyo (JP); Hironari Sudeji, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 515 days.

(21) Appl. No.: 18/262,417

(22) PCT Filed: Feb. 22, 2022

(86) PCT No.: PCT/JP2022/007372
§ 371 (c)(1),
(2) Date: Jul. 21, 2023

(87) PCT Pub. No.: WO2022/181635
PCT Pub. Date: Sep. 1, 2022

(65) Prior Publication Data
US 2024/0218113 A1 Jul. 4, 2024

(30) Foreign Application Priority Data
Feb. 26, 2021 (JP) ................................. 2021-030604

(51) Int. Cl.
*C08G 61/08* (2006.01)
*G02B 1/04* (2006.01)

(52) U.S. Cl.
CPC ............. *C08G 61/08* (2013.01); *G02B 1/041* (2013.01); *C08G 2261/12* (2013.01); *C08G 2261/314* (2013.01); *C08G 2261/3324* (2013.01); *C08G 2261/418* (2013.01); *C08G 2261/724* (2013.01)

(58) Field of Classification Search
CPC ........................ C08G 61/08; C08G 2261/3324
See application file for complete search history.

(56) References Cited

U.S. PATENT DOCUMENTS

| | | | | |
|---|---|---|---|---|
| 7,867,581 B2 * | 1/2011 | Komatsu | .............. | G02B 5/3083 |
| | | | | 526/348.1 |
| 2009/0198037 A1 | 8/2009 | Watanabe | | |
| 2020/0369812 A1 * | 11/2020 | Wasa | .................. | C08L 23/0823 |
| 2023/0002544 A1 | 1/2023 | Sudeji | | |

FOREIGN PATENT DOCUMENTS

| | | | |
|---|---|---|---|
| JP | 3203029 B2 * | 8/2001 | |
| JP | 2005330465 A | 12/2005 | |
| JP | 2009046614 A | 3/2009 | |
| JP | 2009046615 A | 3/2009 | |
| WO | 2019107363 A1 | 6/2019 | |
| WO | 2021107041 A1 | 6/2021 | |

OTHER PUBLICATIONS

Jun. 16, 2025, Communication pursuant to Article 94(3) EPC issued by the European Patent Office in the corresponding European Patent Application No. 22759670.7.
Sergio Cossu et al., (Z)- and (E)-1-Chloro-1,2-Bis(Phenylsulphonyl)Ethylenes: Synthons of Bis(Phenylsulphonyl)Acetylene and of Terminal Acetylenes in Cycloaddition Reactions, Gazzetta Chimica Italiana, 1990, pp. 569-576, vol. 120, XP009539411.
Aug. 29, 2023, International Preliminary Report on Patentability issued in the International Patent Application No. PCT/JP2022/007372.
Dec. 23, 2024, the Extended European Search Report issued by the European Patent Office in the corresponding European Patent Application No. 22759670.7.

* cited by examiner

*Primary Examiner* — Marc S Zimmer
*Assistant Examiner* — Surbhi M Du
(74) *Attorney, Agent, or Firm* — KENJA IP LAW PC

(57) ABSTRACT
Provided is a resin that can simultaneously achieve a high refractive index, high heat resistance, and low birefringence. A hydrogenated cycloolefin copolymer is obtained through hydrogenation of a cycloolefin copolymer that includes a structural unit derived from 1-naphthylnorbornene and a structural unit derived from 2-naphthylnorbornene, wherein an average endo isomer ratio of the 1-naphthylnorbornene and the 2-naphthylnorbornene is 50 mol % or more. The hydrogenated cycloolefin copolymer is suitable for use as a material of an optical element such as an optical lens.

8 Claims, No Drawings

CYCLOOLEFIN COPOLYMER AND HYDROGENATED PRODUCT THEREOF, AND OPTICAL ELEMENT

TECHNICAL FIELD

The present disclosure relates to a cycloolefin copolymer, a hydrogenated product of a cycloolefin copolymer, and an optical element.

BACKGROUND

In recent years, polymers obtained through polymerization of cycloolefins have been attracting attention as materials for optical elements and medical containers.

As one example, Patent Literature (PTL) 1 discloses a norbornene-based ring-opened (co)polymer that has excellent transparency and heat resistance, high solubility in organic solvents, and specific birefringence and wavelength dependence properties. As another example, PTL 2 discloses a cycloolefin copolymer and a film formed of the copolymer that effectively cause the display of reverse wavelength dispersion of birefringence. As another example, PTL 3 discloses a cycloolefin-based copolymer that has a high refractive index while also having an Abbe number that can be adjusted to a low level and also discloses a medical container having excellent transparency and little coloring caused by electron beam or gamma ray irradiation.

CITATION LIST

Patent Literature

PTL 1: JP2009-46615A
PTL 2: JP2009-46614A
PTL 3: WO2019/107363A1

SUMMARY

Technical Problem

In order to enable a greater degree of freedom in the design of optical elements such as optical lenses in a wide range of applications, there is demand for a resin that has a high refractive index and high heat resistance, and that has low birefringence when used in an optical element.

However, it has not been possible to simultaneously achieve a high refractive index, high heat resistance, and low birefringence (for example, stress birefringence) with the conventional polymers described above.

Accordingly, an object of the present disclosure is to provide a resin that can simultaneously achieve a high refractive index, high heat resistance, and low birefringence.

Solution to Problem

The inventors conducted diligent investigation with the aim of solving the problem set forth above. The inventors made a new discovery that a high refractive index, high heat resistance, and low birefringence can be simultaneously achieved in the case of a hydrogenated cycloolefin copolymer resulting from hydrogenation of a cycloolefin copolymer that is obtained through polymerization of a monomer composition including a mixture of 1-naphthylnorbornene and 2-naphthylnorbornene having a specific average endo isomer ratio. In this manner, the inventors completed the present disclosure.

Specifically, the present disclosure aims to advantageously solve the problem set forth above, and a presently disclosed cycloolefin copolymer comprises a structural unit derived from 1-naphthylnorbornene and a structural unit derived from 2-naphthylnorbornene, wherein an average endo isomer ratio of the 1-naphthylnorbornene and the 2-naphthylnorbornene is 50 mol % or more. By hydrogenating a cycloolefin copolymer such as set forth above, it is possible to provide a resin (hydrogenated cycloolefin copolymer) that can simultaneously achieve a high refractive index, high heat resistance, and low birefringence. Therefore, the presently disclosed cycloolefin copolymer is useful as a raw material for a resin that can simultaneously achieve a high refractive index, high heat resistance, and low birefringence.

Note that the "average endo isomer ratio of 1-naphthylnorbornene and 2-naphthylnorbornene" referred to in the present disclosure can be determined by a method described in the EXAMPLES section, for example.

In the presently disclosed cycloolefin copolymer, the structural unit derived from 1-naphthylnorbornene and the structural unit derived from 2-naphthylnorbornene preferably constitute a total proportion of not less than 30 mol % and not more than 70 mol % among all structural units. When the total proportion constituted by the structural unit derived from 1-naphthylnorbornene and the structural unit derived from 2-naphthylnorbornene is within the range set forth above, it is possible to obtain a resin with which high refractive index, high heat resistance, and low birefringence are simultaneously achieved to even higher levels.

Note that the "proportion constituted by each monomer unit" that is referred to in the present disclosure can be measured by nuclear magnetic resonance (NMR) spectroscopy.

In the presently disclosed cycloolefin copolymer, the structural unit derived from 1-naphthylnorbornene preferably constitutes a proportion of not less than 1 mol % and not more than 30 mol % relative to a total of the structural unit derived from 1-naphthylnorbornene and the structural unit derived from 2-naphthylnorbornene. When the proportion constituted by the structural unit derived from 1-naphthylnorbornene is within the range set forth above, it is possible to obtain a resin with which high refractive index, high heat resistance, and low birefringence are simultaneously achieved to even higher levels.

The presently disclosed cycloolefin copolymer preferably further comprises a structural unit derived from a norbornene-based monomer other than 1-naphthylnorbornene and 2-naphthylnorbornene.

Moreover, the presently disclosed cycloolefin copolymer is preferably a ring-opened polymer.

Furthermore, the present disclosure aims to advantageously solve the problem set forth above, and a presently disclosed hydrogenated cycloolefin copolymer is obtained through hydrogenation of any one of the cycloolefin copolymers set forth above. A hydrogenated cycloolefin copolymer that is obtained through hydrogenation of the cycloolefin copolymer set forth above has a high refractive index and heat resistance and has low birefringence, and thus is useful as a material for an optical element such as an optical lens.

The presently disclosed hydrogenated cycloolefin copolymer preferably has a glass-transition temperature of 135° C. or higher. When the glass-transition temperature is 135° C. or higher, heat resistance can be further increased.

Note that the "glass-transition temperature" referred to in the present disclosure can be measured in accordance with JIS K6911 by differential scanning calorimetry.

Also, a presently disclosed optical element comprises any one of the hydrogenated cycloolefin copolymers set forth above. By using the hydrogenated cycloolefin copolymer set forth above, it is possible to obtain an optical element having a high refractive index and heat resistance and having low birefringence.

Advantageous Effect

According to the present disclosure, a resin that can simultaneously achieve a high refractive index, high heat resistance, and low birefringence and a copolymer that is useful as a raw material for this resin are obtained.

Moreover, according to the present disclosure, an optical element that has a high refractive index and heat resistance and has low birefringence is obtained.

DETAILED DESCRIPTION

The following provides a detailed description of embodiments of the present disclosure.

The presently disclosed cycloolefin copolymer may be used as a material for various types of shaped products such as optical elements without any specific limitations, but can suitably be used as a raw material for the presently disclosed hydrogenated cycloolefin copolymer. Moreover, the presently disclosed hydrogenated cycloolefin copolymer can suitably be used as a material for the presently disclosed optical element (for example, an optical lens) but is not specifically limited thereto.

(Cycloolefin Copolymer)

The presently disclosed cycloolefin copolymer is obtained through polymerization of a monomer composition that contains 1-naphthylnorbornene and 2-naphthylnorbornene and that can optionally further contain either or both of a norbornene-based monomer other than 1-naphthylnorbornene and 2-naphthylnorbornene (hereinafter, also referred to as "another norbornene-based monomer") and a non-norbornene-based monomer. In other words, the presently disclosed cycloolefin copolymer includes a structural unit derived from 1-naphthylnorbornene and a structural unit derived from 2-naphthylnorbornene and can optionally further include either or both of a structural unit derived from another norbornene-based monomer and a structural unit derived from a non-norbornene-based monomer. Moreover, in the presently disclosed cycloolefin copolymer, the average endo isomer ratio of the 1-naphthylnorbornene and the 2-naphthylnorbornene used in polymerization is required to be 50 mol % or more.

<Structural Unit Derived from 1-Naphthylnorbornene>

The format of bonding of a 1-naphthyl group to a norbornene ring in 1-naphthylnorbornene that can form a structural unit derived from 1-naphthylnorbornene may, in terms of stereoisomerism, be exo bonding (bonding in the same direction as a bridgehead methylene) or endo bonding (bonding in the opposite direction to the bridgehead methylene). The 1-naphthylnorbornene may be exo-1-naphthylnorbornene, endo-1-naphthylnorbornene, or a mixture thereof so long as the desired average endo isomer ratio can be satisfied.

Note that bicyclo[2,2,1]hept-2-ene-5-(1-naphthyl) in which a 1-naphthyl group is bonded to position number 5 of norbornene (bicyclo[2,2,1]hept-2-ene) is preferable as the 1-naphthylnorbornene.

<Structural Unit Derived from 2-Naphthylnorbornene>

The format of bonding of a 2-naphthyl group to a norbornene ring in 2-naphthylnorbornene that can form a structural unit derived from 2-naphthylnorbornene may also be exo bonding or endo bonding. The 2-naphthylnorbornene may be exo-2-naphthylnorbornene, endo-2-naphthylnorbornene, or a mixture thereof so long as the desired average endo isomer ratio can be satisfied.

Note that bicyclo[2,2,1]hept-2-ene-5-(2-naphthyl) in which a 2-naphthyl group is bonded to position number 5 of norbornene (bicyclo[2,2,1]hept-2-ene) is preferable as the 2-naphthylnorbornene.

<Average Endo Isomer Ratio>

The average endo isomer ratio of the 1-naphthylnorbornene that is used to form a structural unit derived from 1-naphthylnorbornene and the 2-naphthylnorbornene that is used to form a structural unit derived from 2-naphthylnorbornene is required to be 50 mol % or more, and is preferably 60 mol % or more, more preferably 70 mol % or more, and even more preferably 80 mol % or more. In other words, the total proportion constituted by structural units derived from endo-1-naphthylnorbornene and structural units derived from endo-2-naphthylnorbornene relative to the total of structural units derived from exo-1-naphthylnorbornene, structural units derived from endo-1-naphthylnorbornene, structural units derived from exo-2-naphthylnorbornene, and structural units derived from endo-2-naphthylnorbornene in the cycloolefin copolymer is required to be 50 mol % or more, and is preferably 60 mol % or more, more preferably 70 mol % or more, and even more preferably 80 mol % or more. When the average endo isomer ratio is within any of the ranges set forth above, a hydrogenated cycloolefin copolymer that is obtained through hydrogenation of the cycloolefin copolymer enables simultaneous achievement of high refractive index, high heat resistance, and low birefringence to high levels.

Note that no specific limitations are placed on the upper limit for the average endo isomer ratio described above.

The total proportion constituted by structural units derived from 1-naphthylnorbornene and structural units derived from 2-naphthylnorbornene among all structural units in the cycloolefin copolymer is preferably 30 mol % or more, more preferably 35 mol % or more, and even more preferably 40 mol % or more, and is preferably 70 mol % or less, more preferably 65 mol % or less, and even more preferably 60 mol % or less. When the total proportion constituted by structural units derived from 1-naphthylnorbornene and structural units derived from 2-naphthylnorbornene is within any of the ranges set forth above, a hydrogenated cycloolefin copolymer that is obtained through hydrogenation of the cycloolefin copolymer enables simultaneous achievement of high refractive index, high heat resistance, and low birefringence to even higher levels.

The proportion constituted by structural units derived from 1-naphthylnorbornene relative to the total of structural units derived from 1-naphthylnorbornene and structural units derived from 2-naphthylnorbornene is preferably 1 mol % or more, more preferably 5 mol % or more, and even more preferably 10 mol % or more, and is preferably 30 mol % or less, more preferably 25 mol % or less, and even more preferably 20 mol % or less. When the proportion constituted by structural units derived from 1-naphthylnorbornene is within any of the ranges set forth above, a hydrogenated cycloolefin copolymer that is obtained through hydrogenation of the cycloolefin copolymer enables simultaneous achievement of high refractive index, high heat resistance, and low birefringence to even higher levels.

<Structural Units Derived from Other Norbornene-Based Monomers>

Examples of other norbornene-based monomers that can form a structural unit derived from another norbornene-based monomer include norbornene-based monomers that do not include a naphthyl group and naphthyl group-containing norbornene-based monomers other than 1-naphthylnorbornene and 2-naphthylnorbornene without any specific limitations.

Specifically, any compound that includes a norbornene ring and does not include a naphthyl group can be used without any specific limitations as a norbornene-based monomer that does not include a naphthyl group, and examples thereof include:

norbornenes that are unsubstituted or include an alkyl group such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene;

norbornenes that include an alkenyl group such as 5-ethylidenenorbornene, 5-vinylnorbornene, 5-propenylnorbornene, cyclohexenylnorbornene, and 5-cyclopentenylnorbornene;

norbornenes that include an aromatic ring such as 5-phenylnorbornene;

norbornenes that include an oxygen atom-containing polar group such as 5-methoxycarbonylnorbornene, 5-ethoxycarbonylnorbornene, 5-methyl-5-5-methyl-5-ethoxycarbonylnorbornene, methoxycarbonylnorbornene, norbornenyl-2-methyloctanate, 5-norbornenyl-2-methylpropionate, 5,6-di(hydroxymethyl)norbornene, 5,5-hydroxymethylnorbornene, di(hydroxymethyl)norbornene, 5-hydroxy-i-propylnorbornene, 5,6-dicarboxynorbornene, and 5-methoxycarbonyl-6-carboxynorbornene;

norbornenes that include a nitrogen atom-containing polar group such as 5-cyanonorbornene;

polycyclic norbornenes including three or more rings that do not include an aromatic ring structure such as dicyclopentadiene, methyldicyclopentadiene, and tricyclo[5.2.1.0$^{2,6}$]dec-8-ene;

polycyclic norbornenes including three or more rings that include an aromatic ring such as tetracyclo[9.2.1.0$^{2,10}$.0$^{3,8}$]tetradeca-3,5,7,12-tetraene (also referred to as 1,4-methano-1,4,4a,9a-tetrahydro-9H-fluorene) and tetracyclo[10.2.1.0$^{2,11}$.0$^{4,9}$]pentadeca-4,6,8,13-tetraene (also referred to as 1,4-methano-1,4,4a,9,9a, 10-hexahydroanthracene);

tetracyclododecenes that are unsubstituted or include an alkyl group such as tetracyclododecene, 8-methyltetracyclododecene, 8-ethyltetracyclododecene, 8-cyclohexyltetracyclododecene, 8-cyclopentyltetracyclododecene, and 8-methoxycarbonyl-8-methyltetracyclo[4.4.0.1$^{2,5}$.1$^{7,10}$]-3-dodecene;

tetracyclododecenes that include a double bond outside of a ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene;

tetracyclododecenes that include an aromatic ring such as 8-phenyltetracyclododecene;

tetracyclododecenes that include an oxygen atom-containing substituent such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride;

tetracyclododecenes that include a nitrogen atom-containing substituent such as 8-cyanotetracyclododecene and tetracyclododecene-8,9-dicarboxylic acid imide;

tetracyclododecenes that include a halogen atom-containing substituent such as 8-chlorotetracyclododecene;

tetracyclododecenes that include a silicon atom-containing substituent such as 8-trimethoxysilyltetracyclododecene; and hexacycloheptadecenes such as a Diels-Alder adduct of a tetracyclododecene such as described above and cyclopentadiene.

Any compound that includes a norbornene ring and a naphthyl group can be used without any specific limitations as a naphthyl group-containing norbornene-based monomer, and thereof examples include 9-naphthyltetracyclo[6.2.1.1$^{3,}$ $_6$.0$^{2,7}$]dodec-4-ene, 5-dinaphthylmethylsilylmethyl-2-norbornene, 5-trinaphthylsilylmethyl-2-norbornene, 5-(2-dinaphthylmethylsilylethyl)-2-norbornene, and 5-(2-trinaphthylsilylethyl)-2-norbornene.

In particular, from a viewpoint of obtaining a hydrogenated cycloolefin copolymer with which a high refractive index, high heat resistance, and low birefringence are simultaneously achieved to even higher levels, non-polar norbornene-based monomers are preferable as other norbornene-based monomers, norbornenes that are unsubstituted or include an alkyl group (for example, norbornene and 8-ethyltetracyclododecene), norbornenes that include an alkenyl group (for example, ethylidenetetracyclododecene (8-ethylidenetetracyclododecene)), dicyclopentadiene, norbornene derivatives that include an aromatic ring (for example, tetracyclo[9.2.1.0$^{2,10}$.0$^{3,8}$]tetradeca-3,5, 7,12-tetraene (also referred to as 1,4-methano-1,4,4a,9a-tetrahydro-9H-fluorene)), and tetracyclododecenes that are unsubstituted or include an alkyl group (for example, tetracyclododecene and 8-methoxycarbonyl-8-methyltetracyclo[4.4.0.1$^{2,5}$.1$^{7,10}$]-3-dodecene) are more preferable as other norbornene-based monomers, and tetracyclododecene and tetracyclo[9.2.1.0$^{2,10}$.0$^{3,8}$]tetradeca-3,5,7,12-tetraene (also referred to as 1,4-methano-1,4,4a,9a-tetrahydro-9H-fluorene) are even more preferable as other norbornene-based monomers.

The other norbornene-based monomers described above can be used individually or can be used as a combination of two or more types. Moreover, a mixture of isomers may be used as another norbornene-based monomer.

The proportion constituted by structural units derived from other norbornene-based monomers among all structural units in the cycloolefin copolymer is preferably 30 mol % or more, more preferably 35 mol % or more, and even more preferably 40 mol % or more, and is preferably 70 mol % or less, more preferably 65 mol % or less, and even more preferably 60 mol % or less.

<Structural Units Derived from Non-Norbornene-Based Monomers>

Any copolymerizable compound that does not include a norbornene ring can be used without any specific limitations as a non-norbornene-based monomer that can form a structural unit derived from a non-norbornene-based monomer, and examples thereof include cycloolefins such as cyclobutene, cyclopentene, cyclohexene, 3,4-dimethylcyclopentene, 3-methylcyclohexene, 2-(2-methylbutyl)-1-cyclohexene, cyclooctene, and 3a, 5,6,7a-tetrahydro-4,7-methano-1H-indene; and non-conjugated dienes such as 1,4-hexadiene, 4-methyl-1,4-hexadiene, 5-methyl-1,4-hexadiene, and 1,7-octadiene. These non-norbornene-based monomers can be used individually or can be used as a combination of two or more types.

The proportion constituted by structural units derived from non-norbornene-based monomers among all structural units in the cycloolefin copolymer is preferably 30 mol % or less, more preferably 10 mol % or less, and even more preferably 5 mol % or less. Note that the proportion constituted by structural units derived from non-norbornene-based monomers among all structural units may be 0 mol %.

<Structure of Cycloolefin Copolymer>

The presently disclosed cycloolefin copolymer is a copolymer formed through polymerization of a monomer composition containing the above-described 1-naphthylnorbornene and 2-naphthylnorbornene and optionally further containing either or both of another norbornene-based monomer and a non-norbornene-based monomer.

The polymerization may be ring-opening polymerization or addition polymerization, and both a ring-opening polymerized portion and an addition polymerized portion may be included in a single cycloolefin copolymer. In particular, the polymerization is preferably ring-opening polymerization. In other words, the presently disclosed cycloolefin copolymer is preferably a ring-opened polymer, and, more specifically, is preferably a ring-opened polymer polymerized through ring-opening of a norbornene ring.

<Production Method of Cycloolefin Copolymer>

The presently disclosed cycloolefin copolymer can be obtained by, for example, implementing a step (polymerization step) of obtaining a copolymer through polymerization (ring-opening polymerization or addition polymerization) of a monomer composition containing 1-naphthylnorbornene and 2-naphthylnorbornene and optionally further containing either or both of another norbornene-based monomer and a non-norbornene-based monomer, and then optionally implementing a step (collection step) of collecting the copolymer, but is not specifically limited to being obtained in this manner.

The proportion constituted by each monomer in the monomer composition is adjusted in accordance with the proportion constituted by structural units derived from that monomer in the target cycloolefin copolymer. Moreover, the 1-naphthylnorbornene and 2-naphthylnorbornene that are used in polymerization can be produced through a palladium coupling reaction (for example, a reaction of norbornadiene and bromonaphthalene), a Diels-Alder reaction (for example, a reaction of cyclopentadiene and vinylnaphthalene), or the like, for example. Note that the 1-naphthylnorbornene and 2-naphthylnorbornene may, without any specific limitations, be 1-naphthylnorbornene and 2-naphthylnorbornene having different proportional contents of endo isomers that are mixed such as to have the desired average endo isomer ratio.

[Polymerization Step]

In a case in which the cycloolefin copolymer is produced by ring-opening polymerization, the monomer composition can be subjected to ring-opening metathesis polymerization in the presence of a metathesis polymerization catalyst. The ring-opening metathesis polymerization may be performed in a reaction system in which the monomer composition and the metathesis polymerization catalyst are mixed in a solvent (for example, an organic solvent). An activator, chain transfer agent, or other auxiliary agent (for example, a Lewis base) may be further provided in the reaction system in order to improve polymerization efficiency. The following describes reagents such as the catalyst used in ring-opening polymerization and various conditions of the reaction.

A transition metal imide complex represented by formula (1) can be used as the metathesis polymerization catalyst.

$$M(NR^a)X_{4-p}(OR^b)_p \cdot L_q \tag{1}$$

(In formula (1),

M is a metal atom selected from transition metal atoms of group 6 of the periodic table, $R^a$ is a phenyl group that is optionally substituted at one or more of the 3, 4, and 5 positions or a group represented by —$CH_2R^c$, where Re is a hydrogen atom, an optionally substituted alkyl group, or an optionally substituted aryl group, $R^b$ is an optionally substituted alkyl group or an optionally substituted aryl group, X is a halogen atom, an alkyl group, an aryl group, an aralkyl group, or an alkylsilyl group, L is an electron donating neutral ligand, p is 0 or 1, q is an integer of 0 to 2, each X may be the same or different in a case in which more than one X is present, and each L may be the same or different in a case in which more than one L is present.)

M in formula (1) is a transition metal atom of group 6 of the periodic table and can be selected from chromium, molybdenum, and tungsten. Of these metal atoms, molybdenum and tungsten are preferable, and tungsten is more preferable.

The transition metal imide complex of formula (1) includes a metal imide bond (N=$R^a$). $R^a$ is a substituent on a nitrogen atom that forms the metal imide bond.

$R^a$ in formula (1) is a phenyl group that is optionally substituted at one or more of the 3, 4, and 5 positions or a group represented by —$CH_2R^c$.

Examples of possible substituents of the phenyl group of $R^a$ that is optionally substituted at one or more of the 3, 4, and 5 positions include:

an alkyl group (for example, an alkyl group having a carbon number of 1 to 4 such as a methyl group or an ethyl group);

a halogen atom (for example, a fluorine atom, a chlorine atom, or a bromine atom); and an alkoxy group (for example, an alkoxy group having a carbon number of 1 to 4 such as a methoxy group, an ethoxy group, or an isopropoxy group).

Note that substituents present at two or more of the 3, 4, and 5 positions may be bonded to each other.

The phenyl group that is optionally substituted at one or more of the 3, 4, and 5 positions may be:

a phenyl group;

a monosubstituted phenyl group such as a 4-methylphenyl group, a 4-chlorophenyl group, a 3-methoxyphenyl group, a 4-cyclohexylphenyl group, or a 4-methoxyphenyl group;

a disubstituted phenyl group such as a 3,5-dimethylphenyl group, a 3,5-dichlorophenyl group, a 3,4-dimethylphenyl group, or a 3,5-dimethoxyphenyl group;

a trisubstituted phenyl group such as a 3,4,5-trimethylphenyl group or a 3,4,5-trichlorophenyl group; or an optionally substituted 2-naphthyl group such as a 2-naphthyl group, a 3-methyl-2-naphthyl group, or a 4-methyl-2-naphthyl group.

In the group represented by —$CH_2R^c$ of $R^a$, the carbon number of the optionally substituted alkyl group of Re is not specifically limited but is normally 1 to 20, preferably 1 to 10, and more preferably 1 to 4. This alkyl group may be linear or branched. Examples of possible substituents include, but are not specifically limited to, a phenyl group, an optionally substituted phenyl group (for example, a 4-methylphenyl group), and an alkoxy group (for example, an alkoxy group having a carbon number of 1 to 4 such as a methoxy group or an ethoxy group).

The optionally substituted aryl group of Re may be a phenyl group, a 1-naphthyl group, a 2-naphthyl group, or the like. Examples of possible substituents include, but are not specifically limited to, a phenyl group, an optionally substituted phenyl group (for example, a 4-methylphenyl group), and an alkoxy group (for example, an alkoxy group having a carbon number of 1 to 4 such as a methoxy group or an ethoxy group).

$R^c$ is preferably an alkyl group having a carbon number of 1 to 20 such as a methyl group, an ethyl group, a propyl group, an isopropyl group, a butyl group, an isobutyl group, a t-butyl group, a pentyl group, a hexyl group, an octyl group, or a decyl group.

Note that "4−p" in formula (1) is 4 or 3, and thus four or three X groups are present in formula (1). X is a halogen atom, an alkyl group, an aryl group, an aralkyl group, or an alkylsilyl group. Each X may be the same or different.

In the case of X, the halogen atom may be a chlorine atom, a bromine atom, or an iodine atom. The alkyl group may be a methyl group, an ethyl group, a propyl group, an isopropyl group, a butyl group, an isobutyl group, a t-butyl group, a pentyl group, a neopentyl group, or the like.

The aryl group may be a phenyl group, a 4-methylphenyl group, a 2,6-dimethylphenyl group, a 1-naphthyl group, a 2-naphthyl group, or the like.

The aralkyl group may be a benzyl group, a neophyl group, or the like.

The alkylsilyl group may be a trimethylsilyl group, a triethylsilyl group, a t-butyldimethylsilyl group, or the like.

Note that p in formula (1) is 0 or 1, and thus one metal alkoxide bond or one metal aryloxide bond $(OR^b)$ may be present in formula (1). $R^b$ is a substituent on an oxygen atom that forms the metal alkoxide bond or metal aryloxide bond.

$R^b$ is an optionally substituted alkyl group or an optionally substituted aryl group, and the examples and preferred examples of the optionally substituted alkyl group and the optionally substituted aryl group of $R^c$ described above are applicable thereto.

Note that q in formula (1) is an integer of 0 to 2, and thus one or two electron donating neutral ligands (L) may be present in formula (1).

L may be an electron donating compound that includes an atom from group 14 or 15 of the periodic table and may be:

a phosphine such as trimethylphosphine, triisopropylphosphine, tricyclohexylphosphine, or triphenylphosphine;

an ether such as diethyl ether, dibutyl ether, 1,2-dimethoxyethane, tetrahydrofuran, or tetrahydropyran; or an amine such as trimethylamine, triethylamine, pyridine, or lutidine.

Of these examples, ethers are preferable.

The transition metal imide complex of formula (1) is preferably a tungsten imide complex that includes a phenyl imide group (tungsten imide complex for which M is a tungsten atom and $R^a$ is a phenyl group in formula (1)), and is more preferably tetrachlorotungsten phenylimide (tetrahydrofuran) or tetrachlorotungsten phenylimide (tetrahydropyran).

One transition metal imide complex of formula (1) may be used individually, or two or more transition metal imide complexes of formula (1) may be used in combination.

The transition metal imide complex of formula (1) can be synthesized, for example, by a method in which an oxyhalide of a group 6 transition metal and a phenyl isocyanate that is optionally substituted at one or more of the 3, 4, and 5 positions or a monosubstituted methyl isocyanate are mixed with, as necessary, an electron donating neutral ligand (L), an alcohol, a metal alkoxide, and a metal aryloxide (for example, a method described in JP-H5-345817A). The synthesized transition metal imide complex may be purified or isolated by crystallization or the like and then be used in the ring-opening polymerization reaction, or the obtained mixture may be used in that form as a catalyst liquid without purification.

The amount of the transition metal imide complex of formula (1) that is used relative to 100 mol % of monomers can be set as not less than 0.00005 mol % and not more than 1 mol %, and is preferably not less than 0.0001 mol % and not more than 0.7 mol %, and more preferably not less than 0.0002 mol % and not more than 0.5 mol %. When the amount is within any of the ranges set forth above, it is possible to sufficiently avoid complication of catalyst removal and to obtain sufficient polymerization activity.

Although the transition metal imide complex of formula (1) displays catalytic activity by itself, the transition metal imide complex may be combined with an activator so as to obtain a polymerization catalyst having higher activity.

The activator may be a compound of any of groups 1, 2, 12, 13, and 14 of the periodic table that includes a hydrocarbon group having a carbon number of 1 to 20 (for example, an alkyl group). Of such compounds, it is preferable to use an organolithium, organomagnesium, organozinc, organoaluminum, or organotin, and particularly preferable to use an organoaluminum or organotin.

The organolithium may be methyllithium, n-butyllithium, phenyllithium, or the like.

The organomagnesium may be butylethylmagnesium, butyloctylmagnesium, dihexylmagnesium, ethylmagnesium chloride, n-butylmagnesium chloride, allylmagnesium bromide, or the like.

The organozinc may be dimethylzinc, diethylzinc, diphenylzinc, or the like.

The organoaluminum may be trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, or the like.

The organotin may be tetramethyltin, tetra(n-butyl)tin, tetraphenyltin, or the like.

One activator may be used individually, or two or more activators may be used in combination.

In a situation in which an activator is used, the used amount thereof relative to the transition metal imide complex of formula (1) can be set as not less than 0.1 molar equivalents and not more than 100 molar equivalents, and is preferably not less than 0.2 molar equivalents and not more than 50 molar equivalents, and more preferably not less than 0.5 molar equivalents and not more than 20 molar equivalents. When the amount is within any of the ranges set forth above, it is possible to sufficiently obtain improvement of polymerization activity through use of the activator and to sufficiently avoid the occurrence of side reactions.

A Lewis base may be further added in order to control the polymerization rate or the molecular weight distribution of the obtained copolymer.

The Lewis base may be an ether such as diethyl ether or tetrahydrofuran; a ketone such as acetone or cyclohexanone;

a nitrile such as acetonitrile or benzonitrile; an amine such as triethylamine or N,N-diethylaniline; a pyridine such as pyridine or lutidine; a phosphine such as triphenylphosphine; an amide such as dimethylformamide; a sulfoxide such as dimethyl sulfoxide; a phosphine oxide such as triphenylphosphine oxide; an ester such as ethyl acetate; or the like. Of these Lewis bases, ethers, pyridines, and nitriles are preferable. One Lewis base may be used individually, or two or more Lewis bases may be used in combination.

In a situation in which a Lewis base is used, the used amount thereof relative to the transition metal imide complex of formula (1) can be set as not less than 0.1 molar equivalents and not more than 1,000 molar equivalents, and is preferably not less than 0.2 molar equivalents and not more than 500 molar equivalents, and more preferably not less than 0.5 molar equivalents and not more than 200 molar equivalents.

A chain transfer agent can be used in the polymerization reaction. By using a chain transfer agent, it is possible to adjust the molecular weight of the obtained ring-opened polymer and to effectively reduce the content ratio of dimers and the like.

The chain transfer agent may be an α-olefin, an internal olefin, an aromatic vinyl compound, or the like. An internal olefin is a compound that includes a double bond in an inner section of an olefin chain, rather than at the end of the olefin chain. The term "aromatic vinyl compound" is inclusive of compounds having a substituent (for example, an alkyl group) on a vinyl group.

The α-olefin may be an alkene that has a carbon number of 2 to 20 and that includes a double bond at the α position, examples of which include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene.

The internal olefin may be 2-butene, 3-hexene, or the like.

The aromatic vinyl compound may be styrene, α-methylstyrene, 2-methylstyrene, 3-methylstyrene, 4-methylstyrene, 2,4-diisopropylstyrene, 2,4-dimethylstyrene, 4-t-butylstyrene, or the like.

Of these chain transfer agents, 1-hexene, styrene, and 1-decene are preferable in terms of reactivity and molecular weight control, with 1-hexene and styrene being more preferable.

One chain transfer agent may be used individually, or two or more chain transfer agents may be used in combination.

In a situation in which a chain transfer agent is used, the amount of the chain transfer agent that is used can be set as not less than 0.1 mol % and less than 15 mol % relative to 100 mol % of monomers. When the amount is within the range set forth above, effects caused by use of the chain transfer agent are sufficiently obtained. From a viewpoint of reducing the content ratio of dimers and the like, the chain transfer agent is preferably not less than 0.3 mol % and less than 10 mol %, more preferably not less than 0.5 mol % and not more than 9 mol %, and even more preferably not less than 1 mol % and not more than 6 mol %.

The organic solvent is not specifically limited so long as it is inert in the reaction and so long as the monomers and the target copolymer can be dissolved or dispersed therein, and examples thereof include:

aliphatic hydrocarbons such as pentane, hexane, and heptane;

alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane;

aromatic hydrocarbons such as benzene, toluene, and xylene;

halogenated aliphatic hydrocarbons such as dichloromethane, chloroform, and 1,2-dichloroethane;

halogenated aromatic hydrocarbons such as chlorobenzene and dichlorobenzene;

nitrogen-containing hydrocarbon solvents such as nitromethane, nitrobenzene, and acetonitrile;

ethers such as diethyl ether and tetrahydrofuran; and mixed solvents of any of the preceding organic solvents.

Of these solvents, aromatic hydrocarbons, aliphatic hydrocarbons, alicyclic hydrocarbons, and ethers are preferable.

One organic solvent may be used individually, or two or more organic solvents may be used in combination.

The organic solvent may be used in an amount such that the concentration of monomers is not less than 1 mass % and not more than 50 mass %, preferably not less than 2 mass % and not more than 45 mass %, and more preferably not less than 3 mass % and not more than 40 mass %. An amount that is within any of the ranges set forth above allows sufficient productivity and is also convenient in terms of handleability.

The ring-opening polymerization reaction can be performed by stirring the monomers, the transition metal imide complex of formula (1), and the optional activator and chain transfer agent, normally in an organic solvent. During this ring-opening polymerization reaction, at least some of a norbornene-based monomer (1-naphthylnorbornene, 2-naphthylnorbornene, and/or another norbornene-based monomer) may be continuously added.

Components other than the norbornene-based monomer that is continuously added may be loaded into and stirred in a reactor in advance. Stirring of the reaction liquid inside the reactor can be continued during continuous addition of the norbornene-based monomer so as to cause the polymerization reaction to progress.

The norbornene-based monomer that is continuously added may be all or some of the norbornene-based monomer. In terms of reaction selectivity and reaction stability, it is preferable that some of the norbornene-based monomer is continuously added and that the remainder of the norbornene-based monomer is loaded into the reactor in advance. The amount of the norbornene-based monomer that is loaded into the reactor in advance, when the total amount of the norbornene-based monomer is taken to be 100 mass %, can be set as not less than 0.1 mass % and not more than 70 mass %, and is preferably not less than 0.5 mass % and not more than 50 mass %, and more preferably not less than 1 mass % and not more than 35 mass %. An amount that is within any of the ranges set forth above facilitates control of the weight-average molecular weight of the obtained copolymer.

The continuous addition of the norbornene-based monomer can be performed through continuous dropwise addition of a liquid having the norbornene-based monomer dissolved or dispersed in the previously described organic solvent. The concentration of the norbornene-based monomer in this liquid can be set as not less than 1 mass % and not more than 50 mass %, and is preferably not less than 2 mass % and not more than 45 mass %, and more preferably not less than 3 mass % and not more than 40 mass %. An amount that is within any of these ranges allows sufficient productivity and is also convenient in terms of handleability.

The duration of the continuous addition can be set as not less than 20 minutes and not more than 200 minutes. In terms of control of stereochemistry, the duration is preferably not less than 40 minutes and not more than 180 minutes, and more preferably not less than 60 minutes and not more than 160 minutes.

The polymerization temperature can be set as not lower than 20° C. and not higher than 60° C. In terms of control of stereochemistry, the polymerization temperature is preferably not lower than 25° C. and not higher than 55° C., and more preferably not lower than 30° C. and not higher than 50° C.

In terms of control of molecular weight, it is preferable that the continuous addition of the norbornene-based monomer is performed such that the polymerization conversion rate of norbornene-based monomer in the polymerization reaction system at the time at which continuous addition ends is 40% or more. The polymerization conversion rate is more preferably 60% or more. The polymerization conversion rate can be controlled by adjusting conditions of the addition such as the rate of addition of the norbornene-based monomer and by adjusting conditions of the polymerization reaction such as the polymerization temperature. When conditions other than the rate during addition are the same, the polymerization conversion rate tends to increase with a higher rate and tends to decrease with a lower rate. Moreover, the polymerization conversion rate tends to increase with a higher temperature and tends to decrease with a lower temperature. Although no specific limitations are placed on the upper limit, the conversion rate is normally 99% or less.

Once the continuous addition ends, stirring of the reaction liquid is continued, and the polymerization reaction is then ended. The duration of mixing and stirring after the end of addition can be set as not less than 15 minutes and not more than 300 minutes. In terms of polymerization conversion rate and productivity, the duration of mixing and stirring is preferably not less than 20 minutes and not more than 270 minutes, and more preferably not less than 30 minutes and not more than 240 minutes.

At least some of the transition metal imide complex may also be continuously added. This is expected to provide reaction selectivity. The continuous addition of the transition metal imide complex can be performed through continuous dropwise addition of a liquid having the transition metal imide complex dissolved or dispersed in the previously described organic solvent. The concentration of the transition metal imide complex in this liquid can be set as not less than 0.01 mass % and not more than 20 mass %. In terms of solution stability of the complex, the concentration of the transition metal imide complex is preferably not less than 0.1 mass % and not more than 15 mass %, and more preferably not less than 0.5 mass % and not more than 10 mass %. The timing of this continuous addition may be the same as the timing of continuous addition of the norbornene-based monomer or may be a different timing.

In a situation in which a chain transfer agent is used, the amount thereof can be set such that the amount of the chain transfer agent that is continuously added is 0.060 mol/min or more, and preferably 0.080 mol/min or more, and can be set such that the amount of the chain transfer agent that is continuously added is 2.000 mol/min or less, and preferably 1.000 mol/min or less from a viewpoint of control of stereochemistry and reduction of the content ratio of dimers and the like.

In a case in which the cycloolefin copolymer is produced by addition polymerization, the addition polymerization can be performed in the presence of a Ziegler-Natta catalyst, a metallocene catalyst, a nickel catalyst, or a palladium catalyst, for example. Moreover, the addition polymerization may be performed under reaction conditions that are modified as appropriate from commonly known reaction conditions.

[Collection Step]

The copolymer obtained in the polymerization step can be collected as the cycloolefin copolymer. For example, the reaction solution can be mixed with a precipitant (for example, a poor solvent such as isopropanol or methanol) to cause precipitation of the cycloolefin copolymer, and then the cycloolefin copolymer can be collected as a precipitate. The collected cycloolefin copolymer may then be dried (for example, vacuum dried).

(Hydrogenated Cycloolefin Copolymer)

The presently disclosed hydrogenated cycloolefin copolymer is obtained through hydrogenation of the presently disclosed cycloolefin copolymer set forth above. A hydrogenated cycloolefin copolymer that is obtained through hydrogenation of the presently disclosed cycloolefin copolymer set forth above can simultaneously achieve a high refractive index, high heat resistance, and low birefringence.

<Hydrogenation>

The presently disclosed cycloolefin copolymer may include carbon-carbon unsaturated bonds in a main chain. Depending on the types of monomers used in polymerization, a carbon-carbon unsaturated bond may also be present in a substituent bonded to the main chain or a 5-membered ring or in a condensed ring with a 5-membered ring (hereinafter, these are referred to as side chains). Hydrogenation of the cycloolefin copolymer yields a hydrogenated product in which at least some of these carbon-carbon unsaturated bonds have been hydrogenated to form saturated bonds.

A commonly known method can be adopted as the method of hydrogenation. For example, the hydrogenation can be performed by supplying hydrogen to a solution of the cycloolefin copolymer and performing an addition reaction in the presence of a hydrogenation catalyst. The hydrogenation catalyst is preferably a catalyst that hydrogenates carbon-carbon double bonds in a main chain and that does not hydrogenate aromatic rings (for example, a naphthalene ring of a naphthyl group). Examples of such hydrogenation catalysts include ruthenium catalysts (chlorohydridocarbonyltris(triphenylphosphine)ruthenium) and palladium catalysts. Addition of hydrogen may be performed by supplying hydrogen at high pressure (for example, 1 MPa or higher) and performing stirring at high temperature (for example, 120° C. or higher).

Note that the resultant hydrogenated cycloolefin copolymer can be collected by the same method as previously described for the cycloolefin copolymer, for example.

<Percentage Hydrogenation>

It is more preferable that the presently disclosed hydrogenated cycloolefin copolymer is sufficiently hydrogenated. The percentage hydrogenation of the presently disclosed hydrogenated cycloolefin copolymer is preferably 90 mol % or more, more preferably 95 mol % or more, and even more preferably 99 mol % or more. When the value of the percentage hydrogenation is not less than any of the lower limits set forth above, heat resistance of the hydrogenated cycloolefin copolymer can be further increased.

Note that the percentage hydrogenation is the percentage hydrogenation of carbon-carbon unsaturated bonds in a main chain and that aromatic rings such as a naphthalene ring are not normally hydrogenated.

<Physical Properties of Hydrogenated Cycloolefin Copolymer>

The presently disclosed hydrogenated cycloolefin copolymer preferably has the following physical properties.

[Glass-Transition Temperature]

From a viewpoint of heat resistance, the glass-transition temperature of the hydrogenated cycloolefin copolymer is preferably 135° C. or higher, and more preferably 140° C. or higher. Note that the glass-transition temperature of the hydrogenated cycloolefin copolymer can be 250° C. or lower, but is not specifically limited thereto.

[Refractive Index]

The refractive index ($n_d$) of the hydrogenated cycloolefin copolymer is preferably 1.550 or more, and more preferably 1.560 or more in order to cause the display of an optical function of an optical element. Moreover, the refractive index ($n_d$) of the hydrogenated cycloolefin copolymer is preferably 1.640 or less, and more preferably 1.635 or less in order to display a function of an optical element.

Note that the refractive index can vary depending on wavelength and temperature. The refractive index ($n_d$) for light having a wavelength of 587.6 nm at 25° C. is used as the refractive index in the present specification.

[Stress Birefringence]

The stress birefringence ($C_R$) can be determined by applying stress (F) to a measurement sample, subsequently measuring the in-plane retardation (Re(b) [nm]) at a specific wavelength (for example, a wavelength of 543 nm) for a central section of the measurement sample and the thickness (T(b) [mm]), and then calculating a δn value by equations (X1) and (X2), shown below.

$$\delta n = Re(b) \times \left(1/T(b)\right) \times 10^{-6} \quad \text{(X1)}$$

$$C_R = \delta n/F \quad \text{(X2)}$$

A δn value of closer to 0 indicates less birefringence. Moreover, a positive value is exhibited in a case in which the slow axis is the stretching direction, whereas a negative value is exhibited in a case in which the slow axis is orthogonal to the stretching direction.

The stress birefringence ($C_R$) of the hydrogenated cycloolefin copolymer is preferably $750\times10^{-12}$ Pa$^{-1}$ or less, and more preferably $400\times10^{-12}$ Pa$^{-1}$ or less in order to suppress variation of optical element quality.

(Use of Hydrogenated Cycloolefin Copolymer)

The presently disclosed hydrogenated cycloolefin copolymer can be used in the form of a composition. The composition contains the presently disclosed hydrogenated cycloolefin copolymer and optionally further contains a solvent and additives such as a weathering stabilizer, a heat resistance stabilizer, an antistatic agent, a flame retardant, a slip agent, an antiblocking agent, an antifogging agent, a lubricant, a dye, a pigment, a natural oil, a synthetic oil, a wax, and/or a filler.

Note that the presently disclosed hydrogenated cycloolefin copolymer can be mixed with the additives and/or solvent by a known mixing method.

The additives may, more specifically, be any of the additives given as examples in JP2005-330465A, for example. The solvent may be a known solvent such as any of the previously described organic solvents.

The presently disclosed hydrogenated cycloolefin copolymer or the composition containing the presently disclosed hydrogenated cycloolefin copolymer can be advantageously used as a material of an optical element or the like.

The presently disclosed hydrogenated cycloolefin copolymer can also be used in the form of a shaped product. The shaped product is obtained through shaping of the presently disclosed hydrogenated cycloolefin copolymer or the composition that contains the presently disclosed hydrogenated cycloolefin copolymer. Moreover, the shaped product obtained from the presently disclosed hydrogenated cycloolefin copolymer can advantageously be used as an optical element or the like.

Examples of methods by which the shaped product may be shaped include injection molding, extrusion blow molding, injection blow molding, two-stage blow molding, multilayer blow molding, connection blow molding, stretch blow molding, rotational molding, vacuum forming, extrusion molding, calendering, solution casting, hot press forming, and inflation.

EXAMPLES

The following provides a more specific description of the present disclosure based on examples and comparative examples. However, the present disclosure is not limited to the following examples.

Measurements of various physical properties in the following examples and comparative examples were performed according to methods described below.

Moreover, products synthesized by the following Synthesis Examples 1 to 4 were used as naphthylnorbornene in the examples and comparative examples.

<Endo/Exo Ratio of Naphthylnorbornene>

The endo/exo ratio of naphthylnorbornene was determined through measurement by 1H-NMR at 23° C. with deuterated chloroform as a solvent. Specifically, the endo/exo ratio (molar ratio) was determined based on an intensity ratio of a signal at 5.79 ppm originating from an endo isomer and a signal at 6.20 ppm originating from an exo isomer.

<Glass-Transition Temperature>

Glass-transition temperature (Tg) was measured based on JIS K6911 with a heating rate of 10° C./min using a differential scanning calorimeter (produced by Nanotechnology; product name: DSC6220SII).

A higher glass-transition temperature indicates better heat resistance.

<Stress Birefringence $C_R$>

A hydrogenated copolymer was shaped into a sheet form of 35 mm (length)×10 mm (width)×1 mm (thickness) so as to obtain a sample sheet. Both ends of the sample sheet were secured with clips, and then a 55 g weight was secured to one of the clips. Next, the sample sheet was suspended with the clip to which the weight was not secured as an origin inside an oven set to a temperature equal to "hydrogenated copolymer glass-transition temperature (Tg)+15° C." for 1 hour so as to perform stretching treatment. Thereafter, the sample sheet was slowly cooled and restored to room temperature to obtain a measurement sample.

The in-plane retardation (Re(b) [nm]) of a central section of the measurement sample was measured at a measurement wavelength of 543 nm using a birefringence meter (produced by Photonic Lattice, Inc.; product name: WPA-100). In addition, the thickness (T(b) [mm]) of the central section of the measurement sample was measured. These measurement values Re(b) and T(b) were used to calculate a δn value by equation (X1), shown below.

$$\delta n = \mathrm{Re}(b) \times (1/T(b)) \times 10^{-6} \qquad \text{(X1)}$$

This δn value and the stress (F) applied to the sample were then used to calculate the stress birefringence ($C_R$) by equation (X2), show below.

$$C_R = \delta n / F [\mathrm{Pa}^{-1}] \qquad \text{(X2)}$$

A δn value of closer to 0 and a $C_R$ of closer to 0 indicate less birefringence. Moreover, a positive value is exhibited in a case in which the slow axis is the stretching direction, whereas a negative value is exhibited in a case in which the slow axis is orthogonal to the stretching direction.

<Refractive Index>

A hydrogenated copolymer was shaped into a sheet form of 5 mm in thickness and was then left in an atmosphere having a temperature of "glass-transition temperature (Tg)− 15° C." for 20 hours to obtain a measurement sample.

The refractive index ($n_d$, $n_C$, and $n_F$) of the obtained measurement sample was measured at 25° C. using a precision refractometer (produced by Shimadzu Corporation; product name: KPR-200; light source: He lamp (wavelength: 587.6 nm) and $H_2$ lamp (wavelength: 656.3 nm and 486.1 nm)). The table shows the refractive index ($n_d$) for light having a wavelength of 587.6 nm.

Synthesis Example 1: Production of Exo Isomer-Rich 1-naphthylnorbornene

A reactor was charged with 458 g of 1-bromonaphthalene (produced by Wako Pure Chemical Industries, Ltd.), 500 mL of dimethylformamide (produced by Wako Pure Chemical Industries, Ltd.), 455 mL of norbornadiene (produced by Tokyo Chemical Industry Co., Ltd.), 656 mL of piperidine (produced by Wako Pure Chemical Industries, Ltd.), 220 m of formic acid (99%; produced by Wako Pure Chemical Industries, Ltd.), and 2.75 g of a palladium catalyst (bis (triphenylphosphine)palladium dichloride; produced by Tokyo Chemical Industry Co., Ltd.; product code: B1667), and then these materials were stirred at 90° C. for 6.5 hours. The resultant reaction liquid was extracted with ethyl acetate/water, and the organic layer was dried using magnesium sulfate. The dried organic layer was then subjected to filtration and evaporation. Column chromatography (eluent solvent:hexane) of remaining material was then performed so as to remove palladium residue. The resultant solution was subjected to evaporation, and then the remaining liquid was subjected to distillation under reduced pressure (1.2 mm Hg/135° C. to 152° C.). This yielded 269 g of 1-naphthylnorbornene (1-NPNB: bicyclo[2,2,1]hept-2-ene-5-(1-naphthyl)) as a colorless transparent liquid. The endo/exo ratio was measured and was determined to be 0/100.

Synthesis Example 2: Production of Exo Isomer-Rich 2-naphthylnorbornene

A reactor was charged with 458 g of 2-bromonaphthalene (produced by Wako Pure Chemical Industries, Ltd.), 500 mL of dimethylformamide (produced by Wako Pure Chemical Industries, Ltd.), 455 mL of norbornadiene (produced by Tokyo Chemical Industry Co., Ltd.), 656 mL of piperidine (produced by Wako Pure Chemical Industries, Ltd.), 220 mL of formic acid (99%; produced by Wako Pure Chemical Industries, Ltd.), and 2.75 g of a palladium catalyst (bis (triphenylphosphine)palladium dichloride; produced by Tokyo Chemical Industry Co., Ltd.; product code: B1667), and then these materials were stirred at 90° C. for 6.5 hours. The resultant reaction liquid was extracted with ethyl acetate/water, and the organic layer was dried using magnesium sulfate. The dried organic layer was then subjected to filtration and evaporation. Column chromatography (eluent solvent:hexane) of remaining material was then performed so as to remove palladium residue. The resultant solution was subjected to evaporation, and then the remaining liquid was subjected to distillation under reduced pressure (1.2 mm Hg/135° C. to 152° C.). This yielded 269 g of 2-naphthylnorbornene (2-NPNB: bicyclo[2,2,1]hept-2-ene-5-(2-naphthyl)) as a colorless transparent liquid. The endo/exo ratio was measured and was determined to be 0/100.

Synthesis Example 3: Production of Endo Isomer-Rich 1-naphthylnorbornene

A reactor was charged with 264 g of dicyclopentadiene (produced by Tokyo Chemical Industry Co., Ltd.), 1,234 g of 1-vinylnaphthalene (produced by Tokyo Chemical Industry Co., Ltd.), and 15 g of N-nitrosophenylhydroxylamine aluminum salt (produced by Wako Pure Chemical Industries, Ltd.), and then these materials were stirred at 180° C. for 1 hour. The resultant crude product was subjected to distillation under reduced pressure (1.2 mm Hg/135° C. to 152° C.). This yielded 42 g of 1-naphthylnorbornene (1-NPNB: bicyclo[2,2,1]hept-2-ene-5-(1-naphthyl)) as a colorless transparent liquid. The endo/exo ratio was measured and was determined to be 85/15.

Synthesis Example 4: Production of Endo Isomer-Rich 2-naphthylnorbornene

A reactor was charged with 264 g of dicyclopentadiene (produced by Tokyo Chemical Industry Co., Ltd.), 1,234 g of 2-vinylnaphthalene (produced by Sigma-Aldrich), and 15 g of N-nitrosophenylhydroxylamine aluminum salt (produced by Wako Pure Chemical Industries, Ltd.), and then these materials were stirred at 180° C. for 1 hour. The resultant crude product was subjected to distillation under reduced pressure (1.2 mm Hg/135° C. to 152° C.). This yielded 58 g of 2-naphthylnorbornene (2-NPNB: bicyclo[2,2,1]hept-2-ene-5-(2-naphthyl)) as a colorless transparent liquid. The endo/exo ratio was measured and was determined to be 86/14.

Example 1

<Production of Cycloolefin Copolymer>

The exo isomer-rich 1-naphthylnorbornene (Synthesis Example 1), exo isomer-rich 2-naphthylnorbornene (Synthesis Example 2), endo isomer-rich 1-naphthylnorbornene (Synthesis Example 3), and endo isomer-rich 2-naphthylnorbornene (Synthesis Example 4) that were produced in Synthesis Examples 1 to 4 were mixed such that Synthesis Example 1/Synthesis Example 2/Synthesis Example 3/Synthesis Example 4=0.3/3.1/10.7/85.9 (molar ratio) to obtain a naphthylnorbornene (NPNB) mixture. The endo/exo ratio of this mixture was measured and was determined to be 83/17.

After loading 96 g of dehydrated toluene, 2 mol % of 1-hexene, 1.2 mol % of diethylaluminum ethoxide ($Et_2Al$ (OEt)), and 1 mol % of a mixed monomer of the naphthyl-norbornene (NPNB) mixture and tetracyclododecene (TCD) (molar ratio=70:30) into a glass reactor that had been internally purged with nitrogen and then mixing these materials at room temperature, all of a 2.0 mass % toluene solution of tetrachlorotungsten phenylimide (tetrahydrofuran) was loaded into the reactor such as to be 0.4 mol % while maintaining a temperature of 50° C., and then a mixed monomer of the naphthylnorbornene (NPNB) mixture and tetracyclododecene (TCD) (molar ratio=70:30; 0.03 mol in total) was continuously added over 2 hours to perform ring-opening polymerization. Thereafter, 48 mol % of isopropyl alcohol was added to the polymerization solution so as to deactivate the polymerization catalyst and terminate the polymerization reaction. The conversion rate of monomers to polymer at this point was 100%.

Note that "mol %" in the description indicates a percentage value based on the number of moles of the mixed monomer.

<Production of Hydrogenated Cycloolefin Copolymer>

Next, 155 g of cyclohexane was added to 95 g of the resultant reaction solution containing a ring-opened polymer (cycloolefin copolymer), 0.05 mass % of chlorohydridocarbonyltris(triphenylphosphine)ruthenium was further added as a hydrogenation catalyst, the pressure was raised to 4.5 MPa with hydrogen, heating was performed to a temperature of 160° C. under stirring, and then a reaction was carried out for 8 hours to yield a reaction solution containing a hydrogenated cycloolefin copolymer. The obtained solution was poured into a large amount of isopropanol to cause precipitation of the hydrogenated cycloolefin copolymer. The hydrogenated cycloolefin copolymer that had precipitated was filtered off and was then dried in a vacuum dryer (200° C., 1 Torr) for 10 hours to yield 5 g of the hydrogenated cycloolefin copolymer.

The glass-transition temperature (Tg), stress birefringence ($C_R$), and refractive index ($n_d$) of the obtained hydrogenated cycloolefin copolymer were measured by the previously described methods. The results are shown in Table 1.

Example 2

Production and evaluation of a cycloolefin copolymer and a hydrogenated cycloolefin copolymer were performed in the same way as in Example 1 with the exception that in production of the cycloolefin copolymer, a mixture obtained through mixing such that Synthesis Example 1/Synthesis Example 2/Synthesis Example 3/Synthesis Example 4=1.0/3.3/28.0/67.7 (molar ratio) was used as the naphthylnorbornene (NPNB) mixture, and a mixed monomer in which the mixing ratio of the naphthylnorbornene mixture and tetracyclododecene (TCD) was changed to 30:70 (molar ratio) was used. The results are shown in Table 1.

Example 3

Production and evaluation of a cycloolefin copolymer and a hydrogenated cycloolefin copolymer were performed in the same way as in Example 1 with the exception that in production of the cycloolefin copolymer, a mixture obtained through mixing such that Synthesis Example 1/Synthesis Example 2/Synthesis Example 3/Synthesis Example 4=0/1.0/11.0/88.0 (molar ratio) was used as the naphthylnorbornene (NPNB) mixture, and a mixed monomer obtained by mixing the naphthylnorbornene mixture and 1,4-methano-1,4,4a,9a-tetrahydro-9H-fluorene (MTF) such as to be 50:50 (molar ratio) was used as the mixed monomer. The results are shown in Table 1.

Example 4

Production and evaluation of a cycloolefin copolymer and a hydrogenated cycloolefin copolymer were performed in the same way as in Example 1 with the exception that in production of the cycloolefin copolymer, a mixture obtained through mixing such that Synthesis Example 1/Synthesis Example 2/Synthesis Example 3/Synthesis Example 4=4.7/34.8/7.3/53.2 (molar ratio) was used as the naphthylnorbornene (NPNB) mixture, and a mixed monomer in which the mixing ratio of the naphthylnorbornene mixture and tetracyclododecene (TCD) was changed to 30:70 (molar ratio) was used. The results are shown in Table 1.

Comparative Example 1

Production and evaluation of a cycloolefin copolymer and a hydrogenated cycloolefin copolymer were performed in the same way as in Example 1 with the exception that in production of the cycloolefin copolymer, the exo isomer-rich 2-naphthylnorbornene (Synthesis Example 2) was used instead of the naphthylnorbornene mixture, and a mixed monomer in which the mixing ratio of the exo isomer-rich 2-naphthylnorbornene (Synthesis Example 2) and tetracyclododecene (TCD) was changed to 56:44 (molar ratio) was used. The results are shown in Table 1.

Comparative Example 2

Production and evaluation of a cycloolefin copolymer and a hydrogenated cycloolefin copolymer were performed in the same way as in Example 1 with the exception that in production of the cycloolefin copolymer, a mixture obtained through mixing such that Synthesis Example 1/Synthesis Example 2/Synthesis Example 3/Synthesis Example 4=4.7/0/95.3/0 (molar ratio) was used as the naphthylnorbornene (NPNB) mixture, and a mixed monomer in which the mixing ratio of the naphthylnorbornene mixture and tetracyclododecene (TCD) was changed to 30:70 (molar ratio) was used. The results are shown in Table 1.

Comparative Example 3

Production and evaluation of a cycloolefin copolymer and a hydrogenated cycloolefin copolymer were performed in the same way as in Example 1 with the exception that in production of the cycloolefin copolymer, a mixture obtained through mixing such that Synthesis Example 1/Synthesis Example 2/Synthesis Example 3/Synthesis Example 4=3.9/40.2/5.1/50.8 (molar ratio) was used as the naphthylnorbornene (NPNB) mixture. The results are shown in Table 1.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Mixed monomer | NPNB | 1-NPNB/2-NPNB (molar ratio) | 11/89 | 29/71 | 11/89 | 12/88 | 0/100 | 100/0 | 9/91 |
| | | Average endo isomer ratio [mol %] | 83 | 82 | 85 | 52 | 0 | 81 | 48 |
| | | Mixing ratio [mol %] | 70 | 30 | 50 | 30 | 56 | 30 | 70 |
| | TCD mixing ratio [mol %] | | 30 | 70 | — | 70 | 44 | 70 | 30 |
| | MTF mixing ratio [mol %] | | — | — | 50 | — | — | — | — |
| Evaluation | Glass-transition temperature [° C.] | | 136 | 153 | 141 | 148 | 125 | 156 | 116 |
| | $C_R$ value [×10$^{-12}$ Pa$^{-1}$] | | 94 | 740 | 340 | 750 | 260 | 800 | 16 |
| | Refractive index [—] | | 1.609 | 1.569 | 1.586 | 1.56 | 1.569 | 1.568 | 1.607 |

It can be seen from Table 1 that the hydrogenated cycloolefin copolymers of Examples 1 to 4 can simultaneously achieve a high refractive index, high heat resistance, and low birefringence. It can also be seen from Table 1 that the hydrogenated cycloolefin copolymers of Comparative Example 1 and Comparative Example 3 have low heat resistance and that the hydrogenated cycloolefin copolymer of Comparative Example 2 has poor expression of birefringence.

INDUSTRIAL APPLICABILITY

According to the present disclosure, a resin that can simultaneously achieve a high refractive index, high heat resistance, and low birefringence and a copolymer that is useful as a raw material for this resin are obtained.

Moreover, according to the present disclosure, an optical element that has a high refractive index and heat resistance and has low birefringence is obtained.

The invention claimed is:

1. A cycloolefin copolymer comprising: a structural unit derived from 1-naphthylnorbornene; and a structural unit derived from 2-naphthylnorbornene, wherein an average endo isomer ratio of the 1-naphthylnorbornene and the 2-naphthylnorbornene is 50 mol % or more.

2. The cycloolefin copolymer according to claim 1, wherein the structural unit derived from 1-naphthylnor-bornene and the structural unit derived from 2-naphthylnor-bornene constitute a total proportion of not less than 30 mol % and not more than 70 mol % among all structural units.

3. The cycloolefin copolymer according to claim 1, wherein the structural unit derived from 1-naphthylnor-bornene constitutes a proportion of not less than 1 mol % and not more than 30 mol % among a total of the structural unit derived from 1-naphthylnorbornene and the structural unit derived from 2-naphthylnorbornene.

4. The cycloolefin copolymer according to claim 1, further comprising a structural unit derived from a norbornene-based monomer other than 1-naphthylnorbornene and 2-naphthylnorbornene.

5. The cycloolefin copolymer according to claim 1, wherein the cycloolefin copolymer is a ring-opened polymer.

6. A hydrogenated cycloolefin copolymer obtained through hydrogenation of the cycloolefin copolymer according to claim 1.

7. The hydrogenated cycloolefin copolymer according to claim 6, having a glass-transition temperature of 135° C. or higher.

8. An optical element comprising the hydrogenated cycloolefin copolymer according to claim 6.

* * * * *